United States Patent [19]

Budd et al.

[11] Patent Number: 4,963,900

[45] Date of Patent: Oct. 16, 1990

[54] MULTIPLE LASER BEAM SCANNING OPTICS

[75] Inventors: Russell A. Budd, Longmont; Joan S. Goddard, Boulder; Mikel J. Stanich, Longmont, all of Colo.

[73] Assignee: International Business Machines Corporation, Armonk, N.Y.

[21] Appl. No.: 445,085

[22] Filed: Dec. 1, 1989

Related U.S. Application Data

[63] Continuation of Ser. No. 388,544, Aug. 1, 1989, abandoned.

[51] Int. Cl.$^5$ .................. G01D 9/42; G02B 27/17
[52] U.S. Cl. ........................... 346/160; 350/6.8
[58] Field of Search .......................... 350/6.6–6.8; 355/67; 346/160

[56] References Cited

U.S. PATENT DOCUMENTS

| 4,110,796 | 8/2978 | Hughton | 358/298 |
| 4,445,126 | 4/1984 | Tsukada | 346/160 X |
| 4,474,422 | 10/1984 | Kitamura | 350/6.8 |
| 4,538,895 | 8/1985 | Higgins et al. | 355/3 R |
| 4,720,632 | 1/1988 | Kaneko | 350/6.8 X |

*Primary Examiner*—Donald A. Griffin
*Attorney, Agent, or Firm*—Charles E. Rohrer

[57] ABSTRACT

A multiple laser beam scanning optical system for correcting monochromatic and polychromatic aberrations comprising a doublet cylindrical lens for receiving the multiple beams and directing them to a rotating polygonal mirror. Scanning lens means are located to receive the beams from the mirror and direct them to the image plane. The scanning lens is comprised of at least one doublet wherein both elements have approximately the same index of refraction but different dispersion factors at a nominal wavelength

24 Claims, 3 Drawing Sheets

MULTIPLE LASER BEAM SCANNING OPTICS

This application is a continuation-in-part of application Ser. No. 07/388,544 filed Aug. 1, 1989, now abandoned.

This invention relates to an optical system for a multiple beam scanning apparatus with both monochromatic and polychromatic correction, and more particularly to doublet lenses within such a system.

BACKGROUND OF THE INVENTION

Multiple beam lasing systems can be used in a variety of applications such as printing systems wherein rotating polygonal mirrors are used to scan the light beams across a receptive surface. The use of multiple laser beams in a printing system provides the capability of producing more than one line of information at a time, thus providing high speed printing with relatively slow movement of the rotating polygonal mirror. Multiple beam devices provide other capabilities as well; that is, the multiple beams can be used to alter the shape of the effective writing spot by modulating the spots within the spot group or they can be used to modulate the amount of light provided at each picture element (pel) position.

While the use of multiple beam lasing systems have significant advantages over a single beam lasing system, it has been found difficult to provide a system in which all of the beams are in focus at the same plane and in which all of the beams are coordinated to write pels at identical locations in the scan lines or in-line with one another on adjacent lines. These problems are in addition to various other problems which occur in conventional single beam scanning system designs, including $F-\theta$, flat-field, tilt, and diffraction limited issues.

The $F-\theta$ problem is caused by using a rotating polygonal mirror, wherein the lasing beam is scanned across the image plane by the facets of the polygon. As the polygon rotates the angle of scan, $\theta$, changes linearly in time. The linearity problem causes pels at the edges of the scan to have a larger spacing than the pels at the center of the scan. Consequently, placement of pels is a function of the scanning angle, $\theta$. One way to compensate for this problem is to provide a negative power scanning lens group and a positive power scanning lens group to create distortion in the scan so that the pels are more evenly spaced at the image plane across the entire scan.

The flat-field problem is related to proper focus at the image plane where the image plane lies in a flat surface. The problem results from the fact that it is a shorter distance to a flat image plane at the center of the scan than it is at the edges of the scan. Therefore, if focus is provided at the center of the scan the pels may be slightly out of focus at the edges, resulting in a larger edge spot. In order to maintain a small and compact system with relatively short focal length, the flat-field problem is approached by utilizing negative and positive power scanning lens groups, and adjusting the distance between the two lens groups in order to achieve proper focus at the image plane across the entire scan.

Another problem of the conventional single beam lens system is the so-called tilt problem, which is a result of pyramidal facet errors caused by manufacturing imperfections in producing the facets of the rotating polygonal mirror. Tilt errors are minimized through the use of a cylindrical lens together with an anamorphic scan lens set. The cylindrical lens focuses the beam in one dimension at the facet. In that manner, the beam will appear as a line across the facet and will be less subject to tilt errors. After reflection from the facet, the light beam then passes into an anamorphic scan lens set in order to reproduce the original shape of the light beam; that is, to focus the light at the image plane in a slightly elliptical shape.

Still another problem of the single beam lens system relates to the different amount that a beam is refracted depending on whether the beam enters the lens at the center or enters the lens at the edge. This results in the focal point changing for those beams passing through the edge of the lens relative to beams passing through the thicker mid-portion of the lens. In order to minimize the size and expense of a lens system, a complex lens is used which is of diffraction limited design; that is, designed to keep the spot size the same across the scan regardless of whether the light rays pass through the edge of the lens or through the middle of the lens.

The inventors discovered that when a multiple beam scanning lens system was designed to provide $F-\theta$ correction, flat-field correction, tilt correction, and diffraction limited corrections, all of the optical corrections needed for a single beam system, that system still did not operate properly. The problems were that the multiple beams were not all in focus and that the beams were refracted through the lens system a different amount such that they were separated at the image plane. As a result, the pel size was not the same from beam to beam, and when the beams were used to write different lines of information at the image plane, the beams were separated and did not line up properly with pels placed one directly under the other. The inventors came to understand that these effects were caused by the fact that in a single beam lasing system there is only one wavelength to consider, while in a multiple beam lasing system of four (4) lasing sources, there are four (4) wavelengths of light to consider. As a result, in addition to all of the monochromatic corrections previously discussed, the system must be color corrected in order to operate properly. Recognizing that problems of different wavelengths are associated with the refraction of each beam a different amount, lens glasses were chosen that were less dependent on wavelength. In addition, other approaches were taken such as reoptimizing the design with heavy weight on chromatic performance, focussing the collimating lens to produce a converging beam into the scan set, and raising the index of refraction of the scan set elements. Despite these efforts, satisfactory performance was not achieved.

It is, therefore, an object of this invention to produce an optical system for use in a multiple beam scanning printhead apparatus which provides both monochromatic and chromatic compensation.

It is an object of this invention to maintain light from all beams in a multiple beam printhead in focus at the image plane.

It is another object of this invention to compensate for the different refraction of different wavelength light such that pels will line up properly at the image plane.

It is an object of this invention to provide a multiple beam printhead such that proper monochromatic and chromatic operation is achieved while utilizing lasing sources of significantly different wavelength.

SUMMARY OF THE INVENTION

This invention is a rotating polygonal mirror multiple lasing beam scanning system for correcting both monochromatic and chromatic error conditions. A doublet lens with approximately the same index of refraction at a nominal wavelength on both sides of the lens is utilized in order to achieve chromatic compensation. Such a doublet lens may be used in addition to other elements in a scanning system or it may be the positive power scanning lens. Where still better chromatic compensation is needed, the negative power scanning lens may also be comprised of such a doublet. For still greater compensation, triplets may be used. To achieve chromatic correction for focal length problems, a doublet cylindrical lens is utilized. Such a system may be utilized within the frame work of an electrophotographic printing machine to provide a high speed printing machine with relatively low speed rotating polygonal mirrors.

BRIEF DESCRIPTION OF THE DRAWING

The above-mentioned objects and other features and objects of this invention, and the manner of attaining them will become more apparent and the invention itself will best be understood by reference to the following description of embodiments of the invention taken in conjunction with the accompanying drawing, the description of which follows.

DETAILED DESCRIPTION

The application of this invention can be illustrated within the framework of electrophotographic machines wherein prints are produced by creating an image of the subject on a photoreceptive surface, developing the image, and then fusing the image to paper or other print receiving material. In most electrophotographic machines the electrophotographic process is of the transfer type where photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays from a light generating source which will discharge the photoreceptor to relatively low levels when the light source is fully powered, while the photoreceptor will continue to carry high voltage levels when the light source is turned off, or when it is powered at intermediate levels or for a relatively short duration. In that manner, the photoreceptive material is caused to bear a charge pattern which corresponds to the printing, shading, etc., which is desired to be printed on the receiving material.

Light generating sources in an electrophotographic printer are frequently comprised of lasing means in which the beam is modulated by a character generator to control the power or the length of time that a beam exposes the photoconductor in a particular pel area. In a multiple beam lasing system, character generators may modulate more than one beam at a time, so that more than one line of pels may be written at a time.

After producing an image on the photoreceptor, the image is moved to a developing station in the machine where developing material called toner is placed on the image. This material is usually in the form of a powder which carries a charge designed to cause the powder to deposit on selected areas of the photoreceptor.

The developed image is moved from the developer to a transfer station where the copy receiving material, usually paper, is juxtaposed to the developed image and a charge is placed on the backside of the paper so that when it is stripped from the photoreceptor the toner material is held on the paper and removed from the photoreceptor.

The remaining process steps are for permanently bonding toner material to the copy paper and cleaning residual toner left on the photoreceptor so that it can be reused.

Figure 1:
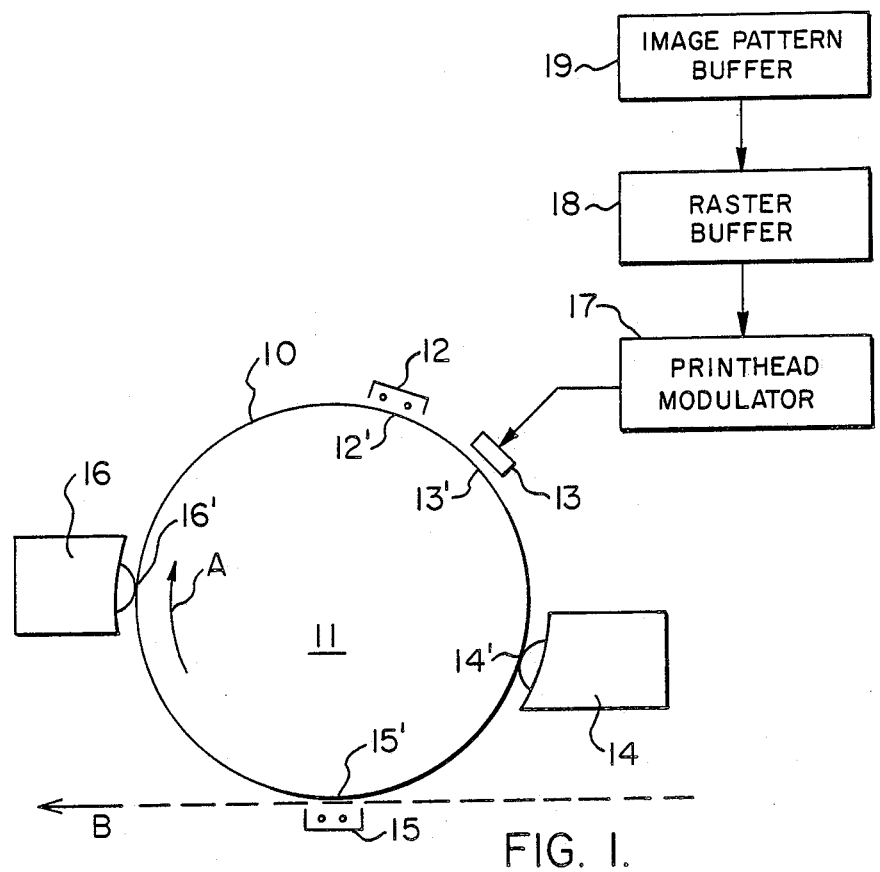
FIG. 1 is a diagrammatic representation of an electrophotographic machine.

FIG. 1 shows a typical electrophotographic machine such as would be used to implement this invention. Photoreceptive material 10 is placed on the surface of a drum 11 which is driven by motive means, not shown, to rotate in the direction A. A charge generator 12 places a uniform charge of several hundred volts across the surface of the photoreceptor at charging station 12'. The charged photoreceptor is mounted in a dark enclosure, not shown, and rotates to a printhead 13 which is comprised of a light generating source, such as a multiple beam laser generator. The light source selectively exposes the charged photoreceptor at imaging station 13' to discharge it in areas which are desired to be developed (Discharged Area Development, DAD process), or discharge it in areas which are to remain free of toner (Charged Area Development, CAD process).

For a DAD process, the discharged areas of the photoreceptor are developed at developing station 14' by developer apparatus 14 which applies toner so that the photoreceptor carries a visually perceptible image of the data. The developed image rotates to transfer station 15' where print paper, moving in the direction B, is juxtaposed with the surface of the photoreceptor. A charge opposite in polarity to the charge on the toner is placed on the backside of the print paper by transfer charge generator 15 such that when the paper is stripped from the surface of the photoreceptor, toner will be attracted to the paper and leave the surface of photoreceptor 10. Any remaining residual toner is cleaned from the photoreceptor at cleaning station 16' by cleaning apparatus 16.

The selective application of light rays to the photoreceptor 10, at imaging station 13', is accomplished through printhead modulator means 17. For a semiconductor laser diode, the printhead modulator is comprised of a power supply, which will either turn the light source on for longer or shorter periods of time to accomplish varying degrees of photoreceptor discharge in accordance with the pattern data, or it will turn the light-generating source on to a greater or lesser illumination intensity in accordance with that data. In any event, modulation will occur in accordance with that data contained in memory 19. That data is sent to a raster buffer 18 and on to the printhead modulator 17.

Figure 2:
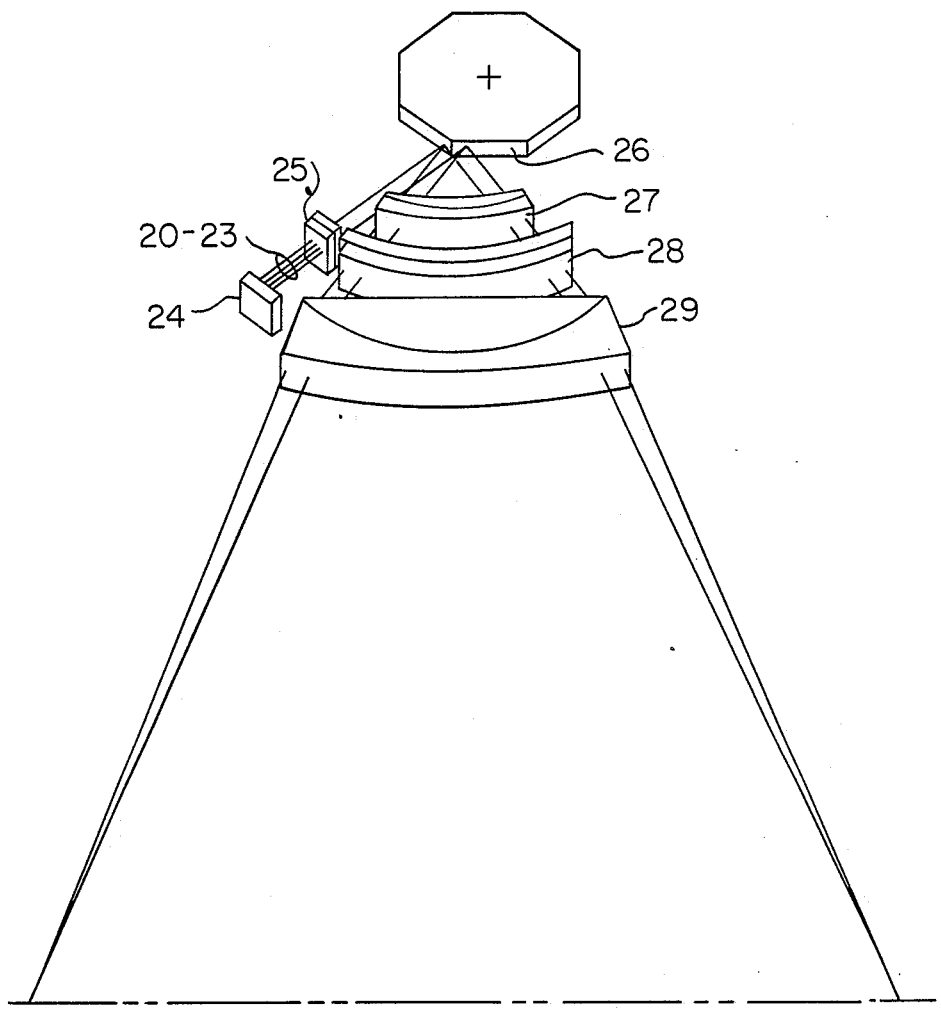
FIGS. 2 and 3 show the optical system of this invention for use in the machine of FIG. 1.
Figure 3:
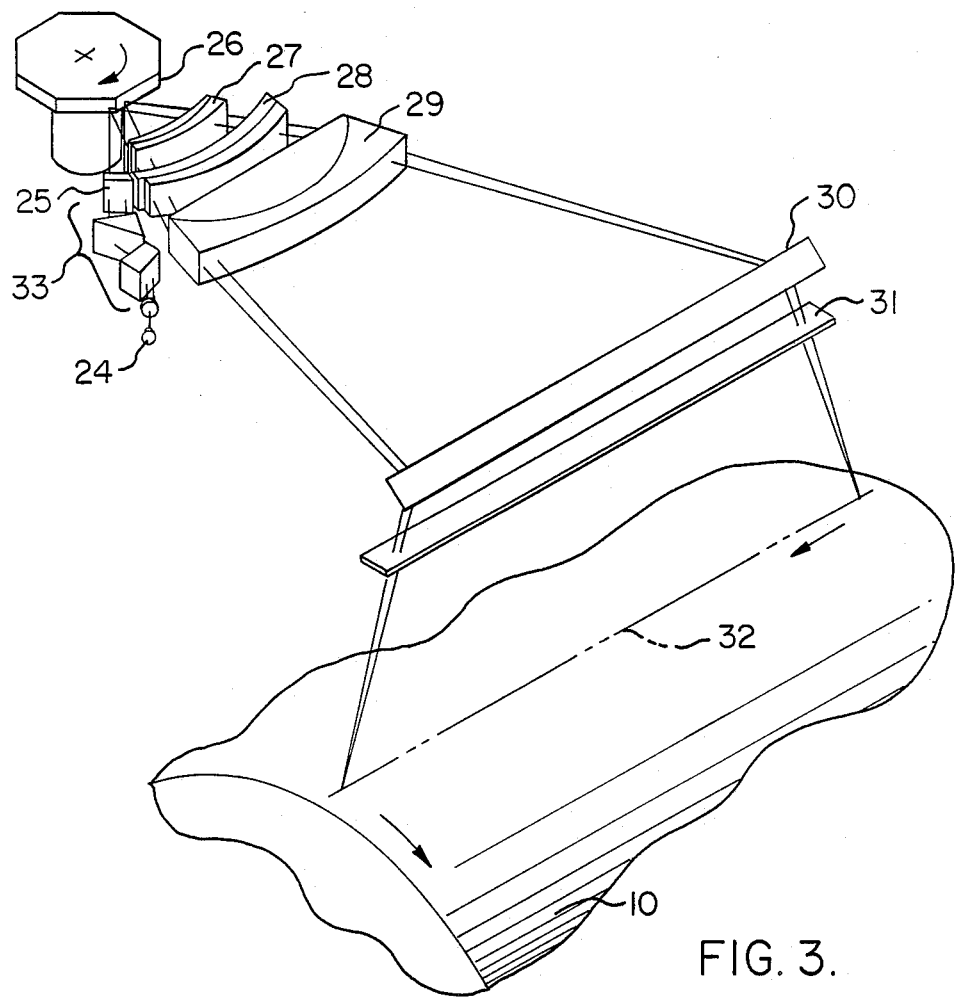

FIGS. 2 and 3 show the optical scanning system of the instant invention. This system can be utilized in printhead 13 of the electrophotographic machine shown in FIG. 1. In the multiple beam system illustrated in FIG. 2, four (4) nearly coaxial laser beams 20-23 are shown emanating from a multiple beam laser module 24. The laser beam module 24 can take the form of four (4) discrete laser chips whose laser beams are then passed through beam combining optics, or preferably, it can be a four (4) beam laser array. The four (4) laser beams are passed through a cylindrical lens 25 for focusing each of the beams onto the facets 26 of a rotating polygon mirror. The beams are reflected from the rotating mirror through a negative spherical lens group 27, anamorphic lens group 28, and a positive spherical lens group 29, and onto, the surface of photoreceptor 10 as shown in FIG. 3. FIG. 3 shows a fold mirror 30, an exit window 31, the length 32 of the scan across photoreceptor 10, and beam expanding optics 33. The unique features of the optical system shown in FIGS. 2 and 3, are the doublet lenses shown for both the negative spherical lens group 27 and the positive spherical lens group 29, together with the doublet for the cylindrical lens 25.

Figure 4:
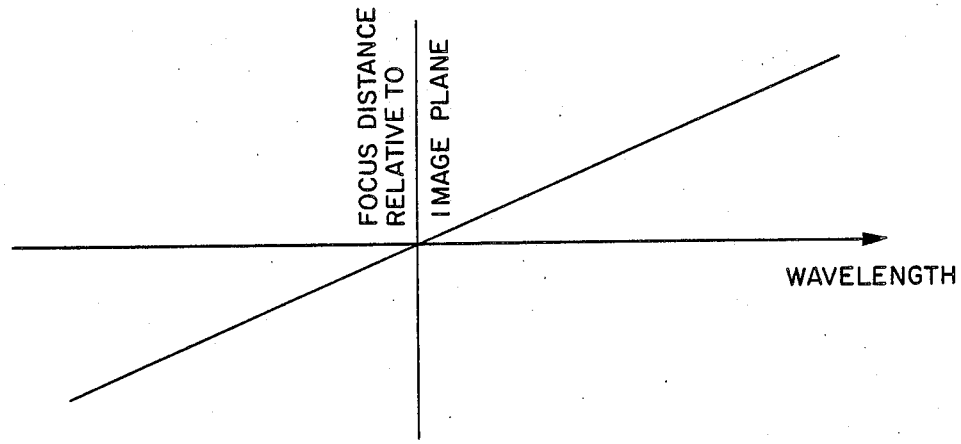
FIG. 4 illustrates change in focal length as wavelength changes.

FIG. 4 is a graph illustrating one of the problems encountered in a multiple beam printhead, in which each of the beams has a wavelength different from the other. FIG. 4 shows that the focal distance to the image plane shifts with wavelength.

The problem illustrated in FIG. 4 is that the focal point varies depending on the lasing wavelength. This results in the out of focus beams producing pel spots which are slightly larger than nominal.

Figure 5:
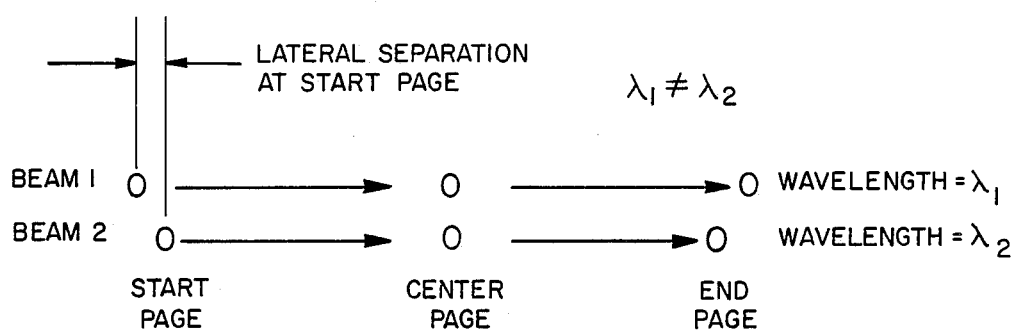
FIG. 5 illustrates lateral separation between pels for light of different wavelength.

FIG. 5 illustrates a second problem associated with multiple beam printheads. As each beam passes through the lens system it is refracted a different amount since the index of refraction of glass changes with wavelength. As a result, the refraction of each beam is different at the image plane and this results in a lateral separation among the beams. As shown in FIG. 5, if the center pels of each beam line up properly, there will be a different starting pel position and a different ending pel position for lines printed by the beams.

The problem illustrated in FIG. 5 is that the pels do not line up on the two sides of the page, thus producing a serious print quality defect. In order to remedy the lateral separation problem, the positive spherical lens 29, as well as the negative spherical lens 27 were replaced by doublet lenses as shown in FIGS. 2 and 3. The doublet lens 29 was comprised of glass of approximately the same index of refraction at a nominal wavelength on both sides, likewise, the doublet lens 27 was also comprised of glass with approximately the same index of refraction on both sides of the doublet. By choosing a doublet design with approximately the same index of refraction on both glasses, all of the monochromatic corrections in the system are retained, that is, the $F-\theta$ correction, the tilt correction, the flat-field correction and the diffraction limited design. By choosing different dispersion factors for the glasses making up the doublets, the lateral separation problem was remedied. Dispersion factor is a measure of the amount that the index of refraction changes as wavelength changes. Consequently, by choosing glasses which refract differently as the wavelength changes, it is possible to keep pels written by different beams in line at the image plane. In order to remedy the focal length problem, the cylindrical lens 25 was made into a doublet.

In the system shown in FIGS. 2 and 3, there are six (6) lens powers to take into account as well as six (6) dispersion factors for the three doublet lenses. It may be noted that the more elements that exist in the system, the better the correction can be. Therefore, if triplet lenses were used as opposed to doublets, there would be additional lens powers and dispersion factors to utilize in order to achieve better and better correction. For some systems, such as a laser array where the initial variation in wavelength might be only a few nanometers (nm.), the lateral separation might be only one or two microns, and depending on the resolution desired, satisfactory lateral separation might be achieved with a doublet lens at the positive scanning lens 29 only. The cylindrical lens 25 would still need to be a doublet in order to correct the focal length problem.

While the index of refraction for each of the glasses of a doublet must be approximately the same, they may be different on one doublet from another. That is to say, the index of refraction of the glasses comprising lens 27 may be different from the index of refraction of the glasses comprising lens 29.

In designing a system to implement the instant invention, a 780 nm. nominal wavelength was selected, and a range of ±15 nm. (30 nm. overall) was provided. The system was designed to handle four (4) beams ranging from a wavelength of 765 nm. to a wavelength of 795 nm. When the system was tested, the actual light sources used ranged from a wavelength of 782 nm. to 826 nm., an overall range of 44 nm., greater than the 30 nm. designed range, and outside of the designed range on the upper end. Despite the out of specification nature of the test, the lateral separation of pels was held to 12 microns, which translates into an error of approximately ±4 microns for the designed range of 30 nm. Without the use of the instant invention, the best system was calculated to produce an error of ±75 microns, almost 19 times greater.

In the test system, lens 27 was comprised of Schott Corporation glass SK2 (607 567) and Schott glass F2 (620 364). The first number in parenthesis shows the index of refraction for the two glasses of the doublet while the second number (the Abbe V number) is based on the dispersion factor of the glass. Lens 29 was comprised of Schott glass LAK10 (720 504) and Schott glass SF10 (728 284). All glass numbers are from Schott Catalog No. 3050. Note that the glasses chosen for each doublet have approximately the same index of refraction while the dispersion factors are different.

It will be understood that the foregoing and other changes in the form and details of the invention may be made therein without departing from the spirit and scope of the invention.

What is claimed is:

1. A multiple laser beam scanning optical system comprising;
    a source for each laser beam;
    a cylindrical lens;
    a rotating polygonal mirror containing facets upon which all laser beams are directed by said cylindrical lens;
    an anamorphic lens means and a scanning lens means for receiving said multiple laser beams from said rotating mirror and directing said beams to an image plane, wherein said scanning lens means is comprised of at least one lens group employing multiple elements all of which have approximately the same index of refraction but different dispersion factors at a nominal wavelength.

2. The optical system of claim 1 wherein said one lens group is a doublet.

3. The optical system of claim 2 wherein said scanning lens means is comprised of a negative power scanning lens group and a positive power scanning lens group and wherein said positive power scanning lens group is comprised of a doublet wherein both elements have approximately the same index of refraction but different dispersion factors at a nominal wavelength.

4. The optical system of claim 3 wherein said negative power scanning lens group is comprised of a doublet wherein both elements have approximately the same index of refraction but different dispersion factors at a nominal wavelength.

5. The optical system of claim 4 wherein said cylindrical lens is a multiple element lens.

6. The optical system of claim 4 wherein said cylindrical lens is a doublet.

7. The machine of claim 6 wherein said one lens group is a doublet.

8. The machine of claim 7 wherein said negative power scanning lens group is comprised of a doublet wherein both elements have approximately the same index of refraction but different dispersion factors at a nominal wavelength.

9. The machine of claim 6 wherein said cylindrical lens is a multiple element lens.

10. The machine of claim 6 wherein said cylindrical lens is a doublet.

11. The machine of claim 7 wherein said cylindrical lens is a multiple element lens.

12. The machine of claim 7 wherein said cylindrical lens is a doublet.

13. The optical system of claim 3 wherein said cylindrical lens is a multiple element lens.

14. The optical system of claim 3 wherein said cylindrical lens is a doublet.

15. The optical system of claim 2 wherein said cylindrical lens is a multiple element lens.

16. The optical system of claim 2 wherein said cylindrical lens is a doublet.

17. The optical system of claim 1 wherein said cylindrical lens is a multiple element lens.

18. The optical system of claim 17 wherein said cylindrical lens is a doublet.

19. An electrophotographic printing machine comprising;
photoreceptive material mounted for cyclical movement;
a charge generating means located adjacent said photoreceptive material for placing a charge across said material;
an imaging station at which said charged photoreceptive material receives light beams to selectively discharge portions of said material in accordance with an image to be printed wherein said imaging station is illuminated by a printhead which includes a source of multiple laser beams;
a cylindrical lens;
a rotating polygonal mirror containing facets upon which all laser beams are directed by said cylindrical lens;
an anamorphic lens means and a scanning lens means for receiving said multiple laser beams from said rotating mirror and directing said beams to an image plane, wherein said scanning lens means is comprised of at least one lens group employing multiple elements all of which have approximately the same index of refraction but different dispersion factors at a nominal wavelength.
toner material;
developer means to deposit said toner material on said image to be printed; transfer means to transfer the developed image from said photoreceptive material to print receiving material.

20. The machine of claim 19 wherein said scanning lens means is comprised of a negative power scanning lens group and a positive power scanning lens group and wherein said positive power scanning lens group is comprised of a doublet wherein both elements have approximately the same index of refraction but different dispersion factors at a nominal wavelength.

21. The machine of claim 20 wherein said cylindrical lens is a multiple element lens.

22. The machine of claim 20 wherein said cylindrical lens is a doublet.

23. The machine of claim 19 wherein said cylindrical lens is a multiple element lens.

24. The machine of claim 19 wherein said cylindrical lens is a doublet.

* * * * *